US009535210B2

(12) United States Patent
Schmidt et al.

(10) Patent No.: US 9,535,210 B2
(45) Date of Patent: Jan. 3, 2017

(54) OPTICAL HOLLOW WAVEGUIDE ASSEMBLY

(71) Applicant: Carl Zeiss SMT GmbH, Oberkochen (DE)

(72) Inventors: Stefan Wolfgang Schmidt, Aalen (DE); Markus Deguenther, Aalen (DE); Vladimir Davydenko, Bad Herrenalb (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 14/992,290

(22) Filed: Jan. 11, 2016

(65) Prior Publication Data

US 2016/0124142 A1    May 5, 2016

Related U.S. Application Data

(63) Continuation of application No. PCT/EP2014/063369, filed on Jun. 25, 2014.

(30) Foreign Application Priority Data

Jul. 11, 2013   (DE) ................. 10 2013 213 564

(51) Int. Cl.
*G02B 6/32* (2006.01)
*F21V 8/00* (2006.01)
(Continued)

(52) U.S. Cl.
CPC ......... *G02B 6/0096* (2013.01); *G02B 27/0006* (2013.01); *G21K 1/06* (2013.01)

(58) Field of Classification Search
USPC .................................. 385/123–125
See application file for complete search history.

(56) References Cited

U.S. PATENT DOCUMENTS 4,120,024 A    10/1978  Aizenberg et al.
5,276,761 A  *  1/1994  Shimoyama ........... G02B 6/032
                                                          385/125

(Continued)

FOREIGN PATENT DOCUMENTS

JP    2000176673 A    6/2000
WO    2012079723 A1   6/2012

OTHER PUBLICATIONS

Office Action in corresponding German Application No. 10 2013 213 564.5, dated Jan. 30, 2014, along with an English translation.

(Continued)

*Primary Examiner* — Eric Wong
(74) *Attorney, Agent, or Firm* — Edell, Shapiro & Finnan, LLC

(57) ABSTRACT

An optical hollow waveguide assembly (1) includes an optical hollow waveguide (2) for guiding illumination light (3). The hollow waveguide (2) has a tubular main body (6) with a continuous waveguide cavity (7). The waveguide cavity has an illumination light inlet (8) and an illumination light outlet (9). A cavity inner wall (10) of the waveguide cavity (7) is configured to be highly reflective for the illumination light (3) under grazing incidence. A gas source (12) has a fluid connection (13) to the waveguide cavity (7). The resulting hollow waveguide assembly exhibits a reduced risk of contamination of the hollow waveguide.

20 Claims, 2 Drawing Sheets

(51) Int. Cl.
*G02B 27/00* (2006.01)
*G21K 1/06* (2006.01)

(56) References Cited

U.S. PATENT DOCUMENTS

| | | | |
|---|---|---|---|
| 5,521,703 A | | 5/1996 | Mitchell |
| 5,729,646 A | * | 3/1998 | Miyagi ............... A61B 18/201 |
| | | | 385/125 |
| 6,552,846 B1 | | 4/2003 | Suzuki |
| 7,373,062 B2 | | 5/2008 | Huber |
| 2005/0157278 A1 | | 7/2005 | Owa et al. |
| 2006/0264167 A1 | | 11/2006 | Lee et al. |
| 2009/0034927 A1 | * | 2/2009 | Temelkuran ......... A61B 18/201 |
| | | | 385/125 |
| 2011/0116077 A1 | | 5/2011 | Chuang et al. |
| 2012/0127566 A1 | | 5/2012 | Mann et al. |
| 2012/0140454 A1 | | 6/2012 | Mann |
| 2012/0147347 A1 | | 6/2012 | Mann et al. |
| 2013/0335552 A1 | | 12/2013 | Feldmann et al. |

OTHER PUBLICATIONS

International Search Report in counterpart International Application No. PCT/EP2014/063369, mailed Sep. 18, 2014.

\* cited by examiner

OPTICAL HOLLOW WAVEGUIDE ASSEMBLY

CROSS-REFERENCE TO RELATED APPLICATIONS

This is a Continuation of International Application PCT/EP2014/063369, which has an international filing date of Jun. 25, 2014, and the disclosure of which is incorporated in its entirety into the present Continuation by reference. The following disclosure is also based on and claims the benefit of and priority under 35 U.S.C. §119(a) to German Patent Application No. DE 10 2013 213 564.5, filed Jul. 11, 2013, which is also incorporated in its entirety into the present Continuation by reference.

BACKGROUND AND FIELD OF THE INVENTION

The invention relates to an optical hollow waveguide assembly. Furthermore, the invention relates to an illumination optical unit comprising such a hollow waveguide assembly, an illumination system comprising such an illumination optical unit, and an inspection apparatus comprising such an illumination system.

A hollow waveguide of the type set forth at the outset is known from U.S. Pat. No. 6,552,846 B1.

Such a hollow waveguide can be one of the guiding reflecting elements in the illumination beam path of the illumination light. The hollow waveguide can therefore be exposed to a contamination by an illumination light source and/or by components of the further illumination optical unit.

SUMMARY

It is an object of the present invention to develop a hollow waveguide assembly, in which the risk of a contamination of the hollow waveguide is low.

According to the invention, this object is achieved by a hollow waveguide assembly comprising: an optical hollow waveguide configured to guide illumination light, comprising: a tubular main body with a continuous waveguide cavity having an illumination light inlet and an illumination light outlet, wherein a cavity inner wall of the waveguide cavity is configured to reflect the illumination light under grazing incidence, and a gas source that has a fluid connection to the waveguide cavity, wherein the gas source is configured to introduce gas into the waveguide cavity, which gas is selected to decontaminate the waveguide cavity under action of the illumination light.

What was identified according to the invention is that gas, e.g. molecular hydrogen, which is introduced into the waveguide cavity by way of the gas source, can be converted into radicals or into other reactive gas species by the illumination light. These then react with potential contamination particles in the waveguide cavity or on a cavity inner wall thereof. Contamination particles can be formed, in particular, by debris from a light source, in particular an EUV light source. The reactive gas species, in particular hydrogen ions or atomic hydrogen, which are also referred to as radicals below and which are formed by the illumination light, therefore ensure a decontamination of the waveguide cavity. The EUV used light or EUV illumination light therefore generates the decontaminator at the same time, namely the reactive gas species. The hollow waveguide can have a rectangular internal cavity cross section. The hollow waveguide can be a rod module. A chemically reducing environment can result over the cavity inner wall, which suppresses an unwanted oxidation of the inner wall and/or an unwanted carbon growth on the inner wall, in particular during the exposure with the illumination light. This can also remove or reduce an initial contamination and/or oxidation of the inner surfaces, which was produced e.g. during the assembly of the hollow waveguide, so that this likewise results in cleaning. In particular, EUV radiation in the wavelength range between 2 nm and 30 nm is used as illumination light. It is also possible to use soft x-ray radiation with different wavelengths, VUV (vacuum ultraviolet) radiation, DUV (deep ultraviolet) radiation or illumination light containing radiation components from various ones of the spectral components specified above. As a gas, the gas source can provide hydrogen, nitrogen, helium, oxygen, water vapour or a mixture of at least two of these gases. When hydrogen is used as gas provided by the gas source and EUV radiation is used as illumination light, the EUV illumination light generates atomic hydrogen in particular, which is particularly effective for decontaminating the reflecting surfaces of the hollow waveguide. The advantages of decontamination by way of the supplied gas are particularly pronounced when using an EUV light source as a result of the contaminations emerging during the operation of typical EUV light sources.

An embodiment of the assembly can be realized easily and with little modification outlay on the optical hollow waveguide.

A configuration according to a further embodiment leads to the possibility of purging the whole waveguide cavity with the gas from the gas source, which further prevents contamination of the cavity inner wall. The at least one gas inlet can be arranged centrally between the illumination light inlet and the illumination light outlet. A different arrangement is also possible. A plurality of gas inlets can also be provided. These can be arranged level between the illumination light outlet and the illumination light inlet, or else in a manner spaced apart along the waveguide.

An opening according to yet another embodiment leads to advantageously small opening dimensions into the waveguide cavity compared with any other inlet. Then, little reflection surface of the cavity inner wall is lost as a result of the opening.

An opening cross section of less than 1 $mm^2$ was found to be sufficiently small. The opening cross section can be even smaller and can be at most 500 $\mu m^2$ or even smaller.

An embodiment comprising at least one positive pressure portion reduces the requirements on the amount of gas to be supplied. The requirements on the discharge of departing gas or produced reaction products, e.g. produced hydrocarbons, are then also reduced.

Two positive pressure portions were found to be particularly suitable. The positive pressure portions are arranged close to the illumination light inlet or the illumination light outlet when the distance of the respective positive pressure portion to the close inlet or outlet is less than one fifth of the distance to the opposite outlet or inlet. An even smaller distance ratio, e.g. one tenth, one twentieth or an even smaller distance ratio, is also possible.

The advantages of an illumination optical unit, an illumination system and an inspection apparatus utilizing the above-described waveguide assembly correspond to those that were already explained above with reference to the hollow waveguide assembly according to the invention.

The light source of the illumination system can be an EUV light source for producing EUV illumination light.

The inspection apparatus can be a mask inspection apparatus and/or a wafer inspection apparatus.

The light source of the illumination system can generate EUV illumination light with a wavelength in the range between 2 nm and 30 nm. The illumination optical unit can be a completely catoptric optical unit, i.e. a pure mirror optical unit.

BRIEF DESCRIPTION OF THE DRAWINGS

Exemplary embodiments of the invention are explained in more detail below with reference to the drawings. In detail.

DETAILED DESCRIPTION

Figure 1:
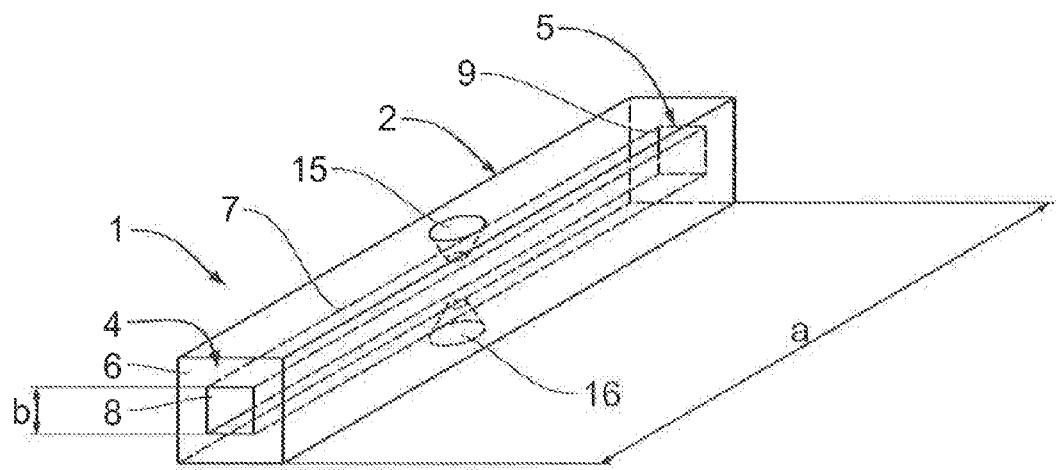
FIG. 1 shows a perspective view of an optical hollow waveguide for guiding EUV illumination light.
Figure 2:
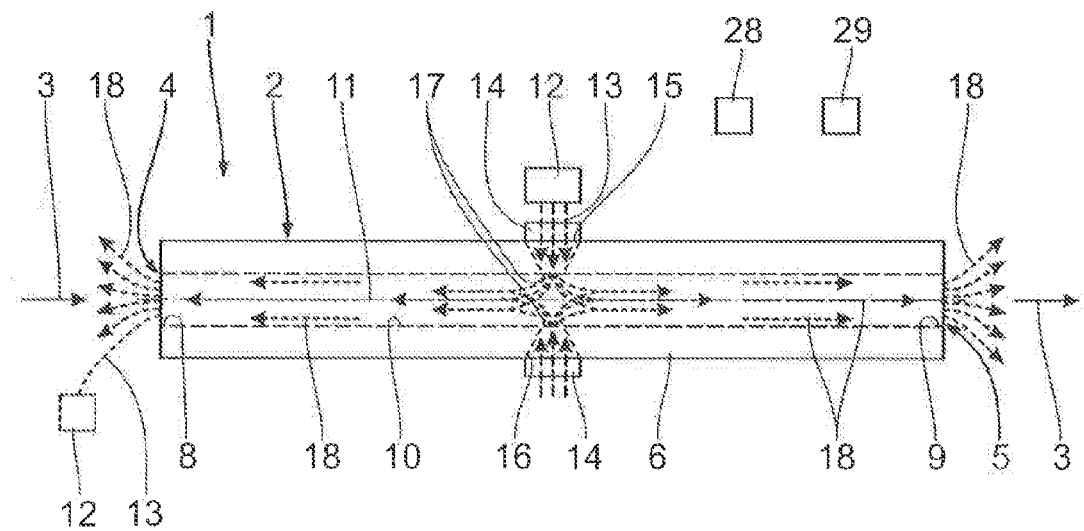
FIG. 2 shows a longitudinal section of an EUV hollow waveguide assembly with the hollow waveguide according to FIG. 1, wherein, moreover, components of a hydrogen source of the assembly which has a fluid connection to a waveguide cavity of the hollow waveguide are depicted.

FIGS. 1 and 2 show a first embodiment of an EUV hollow waveguide assembly 1. It has an optical hollow waveguide 2 for guiding EUV illumination light 3, which is depicted in a perspective view in FIG. 1. As depicted very schematically in FIG. 2, the EUV illumination light is coupled into the hollow waveguide 2 by way of an entry region 4 and decoupled by way of an exit region 5. The hollow waveguide 2 comprises a tubular main body 6 with a continuous waveguide cavity 7. The cavity 7 has a square cross section with a side length b. Alternatively, the cross section of the cavity 7 can also have a rectangular configuration with side lengths of different length. The length of the main body 6 between the entry region 4 and the exit region 5 is denoted by a in FIG. 1. b can be approximately 2 mm. A resulting cross-sectional area for the cavity 7, i.e. for the entry region 4 and the exit region 5 as well, can lie in the range between 0.04 mm$^2$ and 10 mm$^2$. a can be roughly 500 mm.

The waveguide cavity 7 has an illumination light inlet 8 in the entry region 4 and an illumination light outlet 9 in the exit region 5.

A cavity inner wall 10 of the waveguide cavity 7 is configured to be highly reflective for the illumination light 3 under grazing incidence. A reflectivity of the cavity inner wall 10 for the illumination light 3 under grazing incidence is greater than 90% and may be configured to be greater than 95%, greater than 97%, greater than 98%, greater than 99% and may also be greater than 99.5%. An acceptance angle, under which the illumination light 3 is guided in the cavity 7 in a manner deviating from a longitudinal axis 11, may lie in the range of between 2° and 3°. This acceptance angle then corresponds to a divergence of the beam of illumination light 3 emerging from the outlet 9.

A maximum number N of reflections of the illumination light 3 at the inner wall 10 can be approximately nine. A different number is also possible, e.g. 0<N<12.

A hydrogen source 12 is part of the hollow waveguide assembly 1. This hydrogen source has a fluid connection to two hydrogen inlets 15, 16 in the main body by way of a supply line section 13 and a ring line 14. The two inlets 15, 16 have a fluid connection to the waveguide cavity 7. The ring line 14 extends around the main body 6 between the hydrogen inlets 15 and 16 in the circumferential direction about the longitudinal axis 11.

In an embodiment of the hollow waveguide 2 not depicted here, the waveguide cavity may also have only precisely one hydrogen inlet or else more than two hydrogen inlets.

The hydrogen inlets 15, 16 open centrally into the waveguide cavity 7 between the illumination light inlet 4 and the illumination light outlet 5.

An opening 17 of the hydrogen inlets 15, 16 has an embodiment that tapers conically toward the waveguide cavity. An opening cross section of the openings 17 is less than 1 mm$^2$. The opening cross section of the hydrogen inlets 15, 16 into the waveguide cavity 7 may also be smaller and be e.g. 500 μm$^2$.

The hollow waveguide assembly 1 is operated as follows: When guiding the illumination light 3 through the waveguide cavity 7, molecular hydrogen H$_2$ is introduced into the waveguide cavity by way of the hydrogen inlets 15, 16. This molecular hydrogen is distributed over the whole waveguide cavity 7 and interacts with the EUV illumination light 3, as a result of which hydrogen radicals are formed. These react with carbon particles that may precipitate on the inner wall 10 to form hydrocarbons C$_x$H$_y$. As a result of the positive pressure in the waveguide cavity 7 due to the inflowing hydrogen gas, the formed hydrocarbons C$_x$H$_y$ are blown out of the waveguide cavity 7, as indicated by directional arrows 18 in FIG. 2. Hence, there is hydrogen purging of the waveguide cavity 7 by way of the hydrogen source 12. The blown-out hydrocarbons C$_x$H$_y$ can then be suctioned away and disposed of in a controlled manner. There thus is a decontamination of the inner wall 10, the high reflectivity of which for the EUV illumination light 3 is maintained.

Moreover, there is continuous purging of the whole waveguide cavity 7 as a result of the central introduction of the molecular hydrogen, counteracting contamination.

In the case of an embodiment depicted with dashed lines, the hydrogen source 12 comprising the supply line section 13 has a direct fluid connection with the illumination light inlet 8.

Below, a further embodiment of an EUV hollow waveguide assembly 19 is described with reference to FIG. 3. Components corresponding to those which were already explained above with respect to the embodiment according to FIGS. 1 and 2 have been given the same reference signs and are not discussed anew at length.

The hollow waveguide 2 of the assembly 19 has respectively one positive pressure portion 20, 21 in the entry region 4 on the one hand and in the exit region 5 on the other hand, with the waveguide cavity 7 extending between the two positive pressure portions 20, 21. The positive pressure portions 20, 21 each have an extent in the longitudinal direction of the hollow waveguide 2 which is denoted by c in FIG. 3. c/a can be approximately ⅓.

A hydrogen inlet 22, 23 opens into each one of the positive pressure portions 20, 21. These inlets 22, 23 each have a fluid connection to a hydrogen source 12 by way of supply line sections 13.

The positive pressure portions 20, 21 of the waveguide cavity 7 have a fluid connection to the surroundings 25 of the hollow waveguide 2 by way of pressure reduction openings 24 in the region of the inlet 8 and of the outlet 9.

As already explained above in conjunction with the embodiment according to FIGS. 1 and 2, the illumination light 3 is guided in the waveguide cavity 7 when the assembly 19 is in operation. At the same time, molecular hydrogen $H_2$ is introduced into the two positive pressure portions 20, 21 by way of the hydrogen source 12, the supply line sections 13 and the hydrogen inlets 22, 23 and it is introduced into the section of the waveguide cavity 7 between the portions 20, 21 by way of passage openings 26, 27. Here, a pressure $p_1$, $p_2$ is prevalent in the positive pressure portions 20, 21. A pressure $p_3$ sets in in the intermediate waveguide cavity 7. The passage openings 26, 27 are configured in such a way that the following applies to a good approximation: $p_1=p_2=p_3$. It is furthermore true that this pressure is greater than the pressure $p_{ext}$ in the surroundings 25. It is also possible to predetermine small pressure differences between the pressures $p_1$, $p_2$ and $p_3$ of roughly a few 10 Pa, e.g. of the order of 1 Pa, in a targeted manner. As a result of this, it is possible to generate small transport flows in the hollow waveguide 2 in a targeted manner. Contaminations can be transported out of the hollow waveguide 2 by way of these small transport flows. The positive pressure of the pressures $p_1$, $p_2$ and $p_3$ relative to the surroundings 25, i.e. relative to $p_{ext}$, is greater than 1 Pa and is preferably greater than 10 Pa.

This positive pressure leads to a transmission loss for the EUV illumination light 3 between the pressure reduction openings 24 and 25 over the path length a+2c being less than 5% and preferably less than 2%. There always is positive pressure over the pressure of the surroundings 25 in the waveguide cavity 7 such that the EUV illumination light 3 can in turn react with carbon particles possibly deposited at the inner wall 10 to form hydrocarbons $C_xH_y$, wherein these hydrocarbons are transported away into the surroundings 25 due to the positive pressure and are able to be suctioned away there or disposed of in some other way.

The positive pressure present in the cavity 7 moreover ensures that there is constant purging of the waveguide cavity 7, additionally counteracting contamination. There is a constant gas flow outward through the pressure reduction openings 24 to the surroundings 25, which is represented by directional arrows 27a in FIG. 3.

After operation of the assembly 1 or 19 has been completed, nitrogen from a nitrogen source 28 can be initially supplied to the waveguide cavity 7 by way of a multi-port valve in the supply line sections 13 and extra clean dry air (XCDA) can be subsequently supplied to the waveguide cavity 7 by way of a further source 29. This ensures that, during this ventilation process, for example by way of monitoring the pressure, the positive pressure in the waveguide cavity and in the positive pressure portions 20, 21 always remains higher than the pressure in the surroundings 25.

Figure 3:
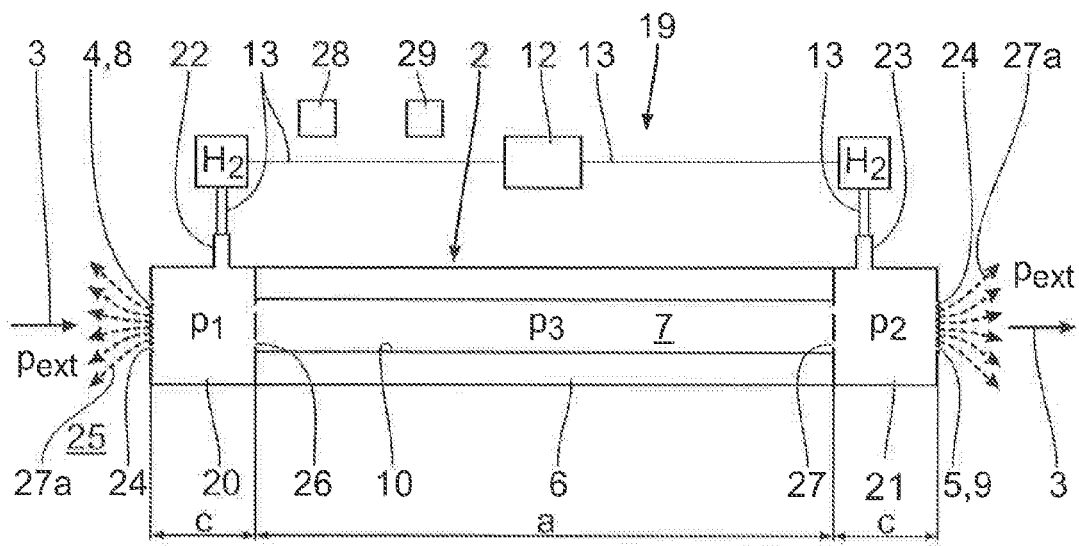
FIG. 3 shows a further embodiment of an EUV hollow waveguide assembly in a similar illustration to FIG. 2.

A line connection between the sources 28, 29 and the supply line section 13 is not depicted in FIGS. 2 and 3.

Figure 4:
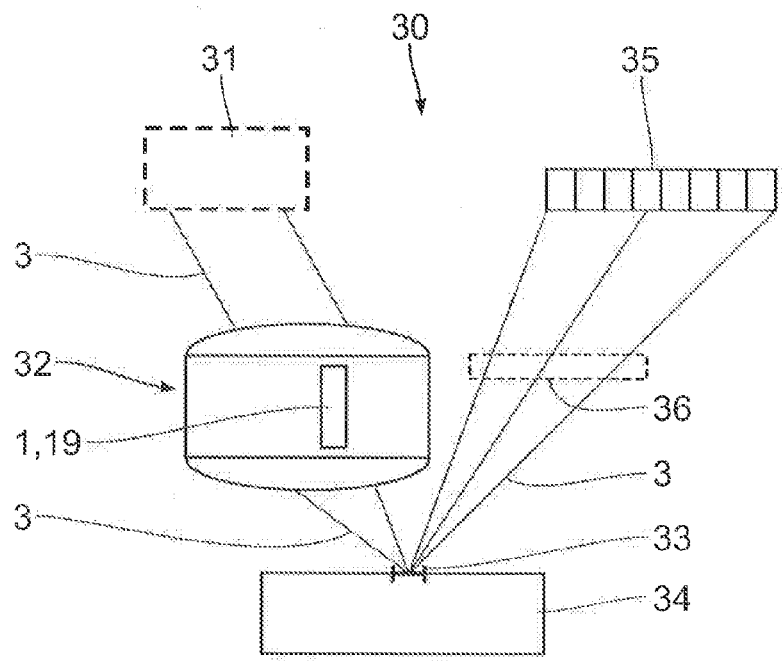
FIG. 4 schematically shows an inspection apparatus comprising an EUV illumination system with an EUV illumination optical unit having an EUV hollow waveguide assembly.

The assemblies 1 and 19 are components of an inspection apparatus 30, which is depicted very schematically in FIG. 4. The inspection apparatus 30 comprises a light source 31 for the EUV illumination light 3. The light source 31 can produce the EUV illumination light 3, i.e. EUV used radiation, in a wavelength range between 2 nm and 30 nm, for example in the range between 2.3 nm and 4.4 nm or in the range between 5 nm and 30 nm. The light sources conventional for EUV lithography systems or projection exposure apparatuses can also be used for the light source 31, that is to say, e.g. laser produced plasma (LPP) sources or else discharge produced plasma (DPP) sources.

In the inspection apparatus 30, the illumination light 3 is guided through an illumination optical unit 32, of which the assembly 1 or 19 is a part as a constituent. By way of example, the illumination light 3 can be guided as described in FIG. 8 of U.S. Pat. No. 6,552,846 B1. Using the illumination optical unit 32, the illumination light 3 is guided toward an illumination field 33 on an object 34 to be inspected, e.g. a reticle or a wafer. The reticle 34 reflects the illumination light 3 to a detection device 35 of the inspection apparatus 30. In relation to components going beyond the assembly 1 or 19, the inspection apparatus 30 can be configured as described in e.g. WO 2012/079 723 A1, US 2012/0140454 A1 or US 2012/0127566 A1. An optical unit 36, e.g. an imaging optical unit, guiding the illumination light 3 can be arranged between the reticle 34 and the detection device 35.

Alternatively, the assembly 1 or 19 can be a component of a projection exposure apparatus for EUV projection lithography. By way of example, such a projection exposure apparatus is described in US 2012/0147347 A1.

The exemplary embodiments above in each case related to EUV hollow waveguide assemblies and hydrogen as gas to be employed. Corresponding hollow waveguide assemblies can also be designed for other illumination light wavelengths, for example for the VUV wavelength range, the DUV wavelength range or for illumination light from a number of these wavelength ranges. Then, a corresponding light source for the other wavelength range or the other wavelength ranges is used instead of an EUV light source. The use of different gases, e.g. nitrogen, helium, oxygen, water vapour, or the use of a mixture of at least two of these gases is also possible.

What is claimed is:

1. An optical hollow waveguide assembly, comprising:
    an optical hollow waveguide configured to guide illumination light, comprising:
        a tubular main body with a continuous waveguide cavity having an illumination light inlet and an illumination light outlet,
        wherein a cavity inner wall of the waveguide cavity is configured to reflect the illumination light under grazing incidence,
    a gas source that has a fluid connection to the waveguide cavity,
        wherein the gas source is configured to introduce gas into the waveguide cavity, and
    a chemically reducing environment over the cavity inner wall,
        wherein the chemically reducing environment comprises radicals produced in the gas under action of the illumination light, and the atmosphere is selected to decontaminate the waveguide cavity.

2. The waveguide assembly according to claim 1, wherein the gas source has a fluid connection to the waveguide cavity at the illumination light inlet and/or at the illumination light outlet.

3. The waveguide assembly according to claim 1, wherein the gas source has a fluid connection to the waveguide cavity via at least one gas inlet that opens into the waveguide cavity between the illumination light inlet and the illumination light outlet.

4. The waveguide assembly according to claim 3, wherein an opening of the at least one gas inlet tapers conically toward the waveguide cavity.

5. The waveguide assembly according to claim 3 wherein an opening cross section of the gas inlet into the waveguide cavity is less than 1 $mm^2$.

6. The waveguide assembly according to claim 1, further comprising at least one positive pressure portion of the waveguide cavity, into which at least one gas inlet of the fluid connection to the gas source opens, wherein the at least one positive pressure portion is connected to a space surrounding the hollow waveguide through at least one pressure reduction opening such that, when gas is supplied via the gas source to the at least one positive pressure portion, a pressure ($p_1$, $p_2$) in the pressure reduction opening is greater than a pressure ($p_{ext}$) of the surrounding space.

7. The waveguide assembly according to claim 6, further comprising a further positive pressure portion, wherein the one positive pressure portion is arranged in proximity to the illumination light inlet and the further positive pressure portion is arranged in proximity to the illumination light outlet.

8. An illumination optical unit comprising a hollow waveguide assembly as claimed in claim 1.

9. An illumination system comprising an illumination optical unit as claimed in claim 8 and a light source.

10. An inspection apparatus comprising an illumination system according to claim 9 and configured to receive an object for inspection.

11. The optical hollow waveguide assembly of claim 1, wherein the gas comprises molecular hydrogen.

12. The optical hollow waveguide assembly of claim 1, wherein the illumination light comprises Extreme Ultraviolet (EUV) illumination.

13. The optical hollow waveguide assembly of claim 1, wherein the radicals comprise hydrogen radicals.

14. The optical hollow waveguide assembly of claim 1, wherein the atmosphere comprises a positive pressure atmosphere.

15. A method comprising:
  introducing a gas into an optical hollow waveguide comprising a cavity inner wall of the waveguide cavity configured to reflect illumination light under grazing incidence to guide the illumination light, wherein introducing the gas comprises introducing gas into the cavity from a gas source having a fluid connection with the cavity;
  transmitting the illumination light through the cavity;
  forming a reducing atmosphere including radicals in the cavity, wherein forming the reducing atmosphere comprises causing the illumination light to act on the gas to form the radicals; and
  decontaminating the cavity under action of the reducing atmosphere.

16. The method of claim 15, wherein transmitting the illumination light through the cavity comprises transmitting Extreme Ultraviolet (EUV) illumination.

17. The method of claim 15, wherein causing the illumination light to act on the gas to form the radicals comprises causing EUV light to act on a gas comprising molecular hydrogen to form hydrogen radicals.

18. The method of claim 15, wherein decontaminating the cavity under action of the reducing atmosphere comprises:
  reacting the radicals with carbon particles on the inner walls of the cavity to form hydrocarbons; and
  blowing the hydrocarbons out of the cavity by positive pressure of the reducing atmosphere.

19. The method of claim 15, wherein introducing the gas into the optical hollow waveguide comprises introducing the gas via at least one gas inlet that opens into the waveguide cavity between an illumination light inlet and an illumination light outlet.

20. The method of claim 19, wherein introducing the gas via the at least one gas inlet comprises introducing the gas via an opening of the at least one gas inlet that tapers conically toward the waveguide cavity.

* * * * *